Sept. 20, 1938.   V. E. PRATT   2,130,562
SELECTING AND INDICATING DEVICE
Filed March 11, 1936   3 Sheets-Sheet 1

INVENTOR
VERNEUR E PRATT
BY
ATTORNEY

Sept. 20, 1938.   V. E. PRATT   2,130,562
SELECTING AND INDICATING DEVICE
Filed March 11, 1936   3 Sheets-Sheet 2
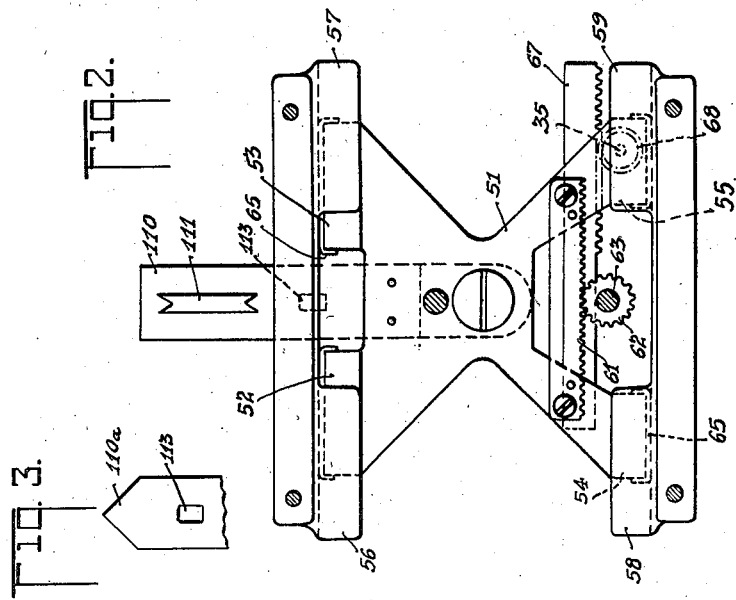
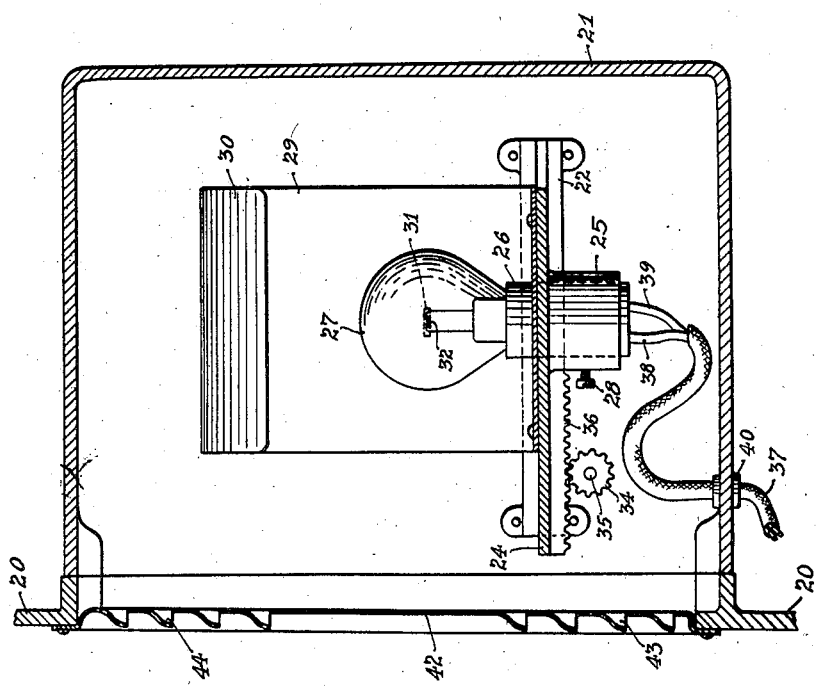
INVENTOR
VERNEUR E. PRATT
BY
ATTORNEY Sept. 20, 1938. V. E. PRATT 2,130,562
SELECTING AND INDICATING DEVICE
Filed March 11, 1936   3 Sheets-Sheet 3
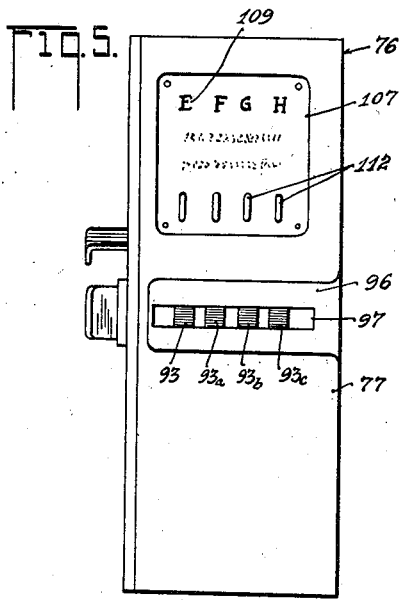
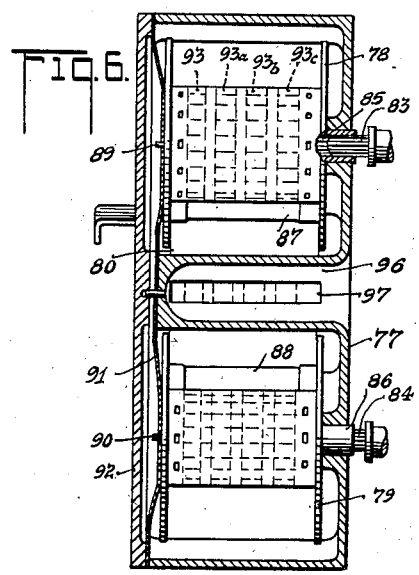
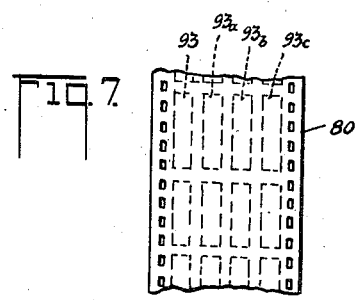
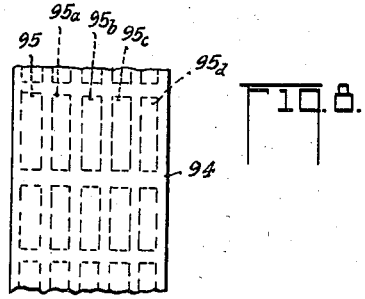
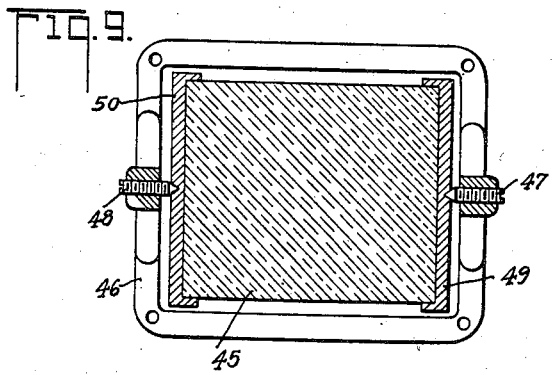
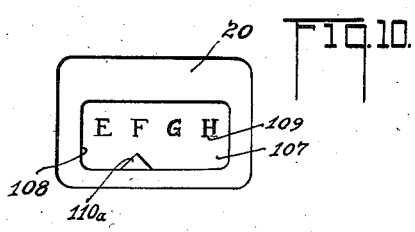
INVENTOR
VERNEUR E. PRATT
BY
ATTORNEY

Patented Sept. 20, 1938

2,130,562

UNITED STATES PATENT OFFICE 2,130,562

SELECTING AND INDICATING DEVICE

Verneur E. Pratt, Stamford, Conn., assignor, by mesne assignments, to Plant Liquidation Corporation, a corporation of New Jersey Application March 11, 1936, Serial No. 68,209

19 Claims. (Cl. 88—24)

The present invention relates to selecting and indicating devices.

An object of the invention is to provide a device adapted to be registered with different groups, columns or pages of data on a film for selectively projecting the same.

Another object is to provide means in a device of the above character for automatically locking the device in accurate registry with the group, column or page selected for projection.

A further object is to provide means to visibly indicate to the operator the particular group, column or page selected.

Another object is to provide a lens system adapted to traverse the film to register with the data thereon.

Another purpose is to provide a light source movable in synchronism with the lens system as the latter traverses the film.

Other objects and advantages of the invention will appear during the course of the following description in connection with the accompanying drawings, in which—

Figure 2 is a detail view of the selector yoke and related parts.

Figure 3 shows an optional form of indicating finger.

Figure 4 is a cross sectional rear view of the light source and housing on the lines 4—4, Figure 1;

Figure 5 is a front view of a film magazine showing the column indicia and selector detents;

Figure 6 is a view of the same partly in cross section;

Figure 7 shows a typical strip of perforated film illustrating columns thereon;

Figure 8 shows a similar strip of imperforate film;

Figure 9 is a longitudinal sectional view of the cylindrical condensing lens and film guide used in the projector, Figure 1;

Figure 10 is a fragmental view showing the indicia on the magazine viewed directly through the observing window.

Figure 1:
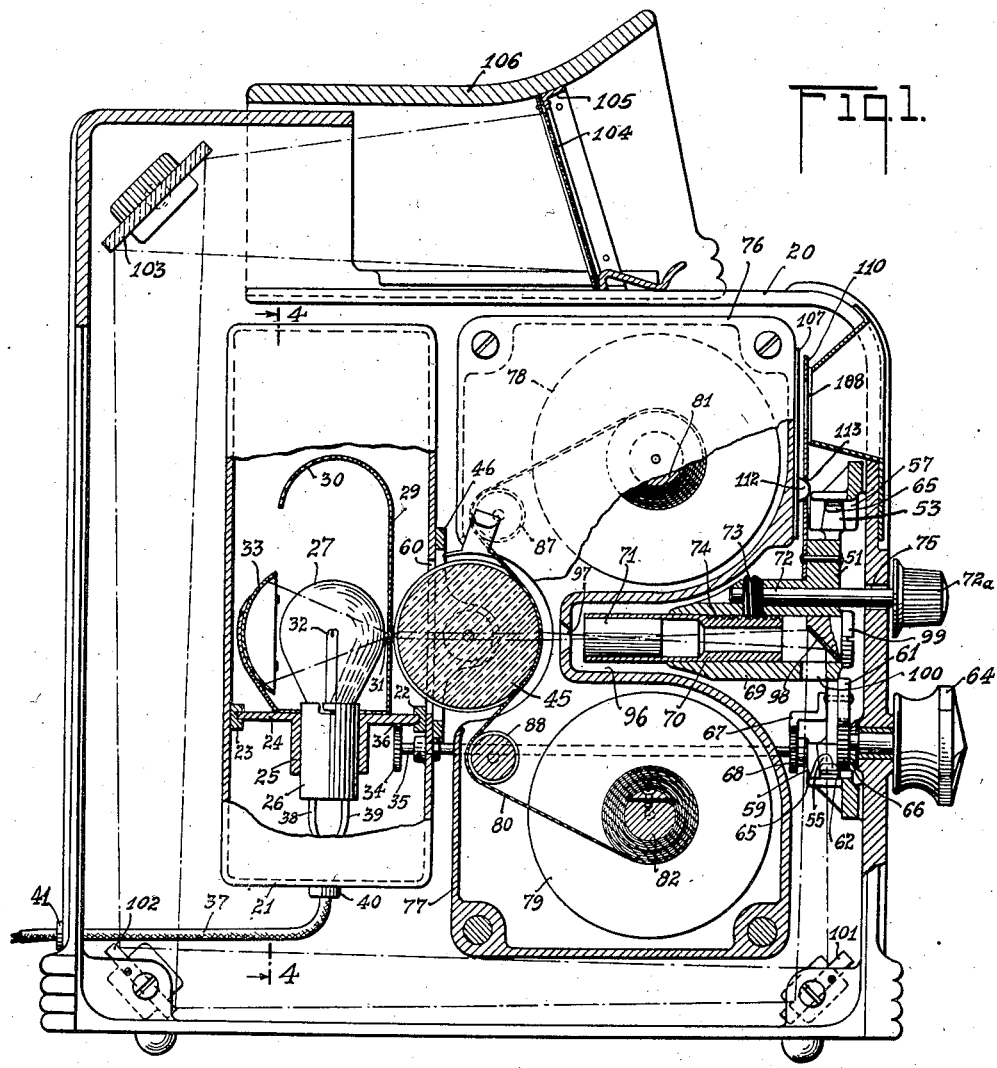
Figure 1 is a longitudinal view, partly in section, showing the device incorporated in a typical projector.

Referring to Figure 1, the numeral 20 indicates the main casing of a film book or reference projector of the type described and claimed in co-pending application Serial Number 68,204, filed March 11, 1936.

Secured in the casing 20 is a housing 21 having attached to the walls thereof channels or rails 22 and 23 disposed transversely with respect to the projector. A plate 24, slidably retained in the rails 22 and 23 has formed or secured thereon a sleeve 25 in which is adjustably secured a lamp socket 26 holding a lamp 27. A set screw 28, shown in Fig. 4, may be provided to hold the socket and lamp in vertical adjustment. A shield 29, preferably of metal, is secured to the plate 24 directly in front of the lamp 27, and has its upper portion 30 curved back to overlie the lamp as shown in Fig. 1. A light slot 31 is provided in the shield 29 in line with the filament 32 of the lamp. A suitable reflector 33 is secured to the plate 24 behind the lamp in such position as to concentrate the light through the slot 31.

A pinion 34 on the end of a shaft 35, journalled in the housing 21, meshes with a rack 36 secured to the plate 24. A flexible supply cord 37 comprising leads 38 and 39 connected to the socket 26, is carried through a bushing 40 in the bottom of the housing 21, thence through a second bushing 41 to the outside of the projector casing 20 as shown in Fig. 1.

A side plate 42 on the casing 20 forms a closure for the housing 21 and has lower and upper louvres 43 and 44 for the admission and escape of ventilating air.

A cylindrical film guide 45, which in the case of the projector illustrated also constitutes a cylindrical lens of the type described and claimed in co-pending application Serial No. 68,206, filed March 11, 1936, is rotatably mounted on a bracket 46 by means of adjustable axial pivots 47 and 48 engaging end caps 49 and 50 on the cylindrical guide 45, as shown in Fig. 9. The bracket 46 is secured to the lamp housing 21, the cylindrical lens or film guide 45 extending into an opening 60 therein adjacent and in line with the light slot 31.

A yoke 51, shown in detail in Fig. 2, has formed thereon upper tapered shoes 52 and 53, and lower similar shoes 54 and 55. The upper shoes 52 and 53 are slidable in downwardly directed alined channels or rails 56 and 57 secured transversely inside the front of the casing 20, while the lower shoes 54 and 55 are slidable in upwardly directed channels 58 and 59 similarly secured in the casing. A rack 61, secured to the yoke 51, meshes with a pinion 62 on a shaft 63 journalled in the front of casing 20 and having an exterior knob 64.

U-shaped springs 65 are disposed around the shoes 52, 53, 54 and 55 and bear in the bottom of the channel rails, thereby steadying the sliding of the shoes therein and preventing vibration, as well as furnishing friction to retain the shoes accurately at any point in the rails to which they may be adjusted, as hereinafter set forth. A spring washer 66 may also be provided on the shaft 63 between the pinion 62 and the casing to steady and prevent vibration of the shaft.

A second rack 67 on the yoke 51 meshes with a pinion 68 on the shaft 35 which extends into the light housing as previously described, the pinion 68 having the same pitch diameter as the pinion 34.

Formed on or secured to the yoke 51 is a sleeve 69 in which is slidably retained a lens barrel 70. A small barrel 71 containing the usual projection lens combination is secured in the barrel 70, the small barrel 71 and its contained parts being hereinafter referred to collectively as the projection lens.

A shaft 72 journalled in the yoke 51 carries a worm 73 meshing with concave rack threads 74 cut in the top of the lens barrel 70. The shaft 72 projects through a lateral slot 75 in the front of casing 20 and carries an exterior knob 72ª by means of which the worm 73 may be revolved to move the barrel 70 inward or outward, thus effecting a focusing adjustment of the projecting lens 71.

A film magazine 76 preferably of the general type fully described and claimed in co-pending application Serial No. 68,208, dated March 11, 1936, having a hollow body 77 containing upper and lower film reels 78 and 79 on which is wound a film 80, the ends of the film being secured to the hubs 81 and 82 of the heels. The reels 78 and 79 are adapted to be individually driven through their hubs, for example by splined shaft noses 83 and 84, Fig. 6, engaging the hollow inner pivots 85 and 86 secured in the hubs, the splined members 83 and 84 being manually operable by suitable cranking means (not shown) extending through the rear side of the projector. When either reel is driven to reel the film 80 thereon, the film itself in unreeling from the other reel, drives the latter. The film 80 in its progress from reel to reel passes over guide rollers 87 and 88 and engages the convex surface of the rotary cylindrical guide 45.

The reels are pivotally supported at 89 and 90, Fig. 6, in a spring plate member 91 secured between the magazine body 77 and a cover plate 92 fastened thereon. The spring plate 91 presses the reels inward, thus holding them in accurate lateral position in the magazine, and at the same time creates friction tending to retard the rotation of the reels. When one reel is being rotated to wind the film thereon, thereby rotating the other reel through tension of the film unwinding therefrom, the frictional resistance of the unwinding reel to rotation keeps the film taut against the film guide 45.

Magazine 76, containing the reels 78, 79 and their associated hubs and the film 80, is placed in and removable from the main casing 20 as a unit. Means partly on the magazine and partly on the main casing 20, such as apertures in the magazine and pins secured to the wall of the casing 20, definitely position the magazine therein, all as fully described in copending application Serial No. 68,208 heretofore mentioned and filed concurrently herewith.

The necessity and convenience of a removable magazine unit of this type will be apparent when it is considered that machines of the type herein described are intended for use by individuals having no special knowledge of projection apparatus and must therefore be made so that the average person can use them and cannot possibly make a mistake when changing the magazines. It will be observed that with this type of magazine the film is permanently secured to the reels and when changing the films in the machine the entire magazine containing the film is removed from the machine and another magazine substituted and that the user does not change films nor does the user thread film through the mechanism between the lamp and the projecting lens as the film is properly located when the magazine is placed in the projector, no threading operation being necessary.

The film 80 may carry thereon microscopically photographed images of reading or reference material, which may be arranged in columns, groups, or pages, such as 93, 93ª, 93ᵇ and 93ᶜ, Figs. 5, 6, and 7, arranged side by side across the width of the film 80. Due to the fact that no sprockets are used in driving the film, an imperforate film such as 94, Fig. 8, may be used instead of the standard type 80. Due to the absence of sprocket perforations in the film 94, the entire width thereof is available for projection, the columns or pages 95, 95ª, 95ᵇ, 95ᶜ and 95ᵈ utilizing substantially the entire area of the film.

A lateral pocket 96 in the magazine 76 allows the projection lens 71 to be disposed in close proximity to the film 80, an aperture 97 in the wall of the pocket allowing the lens to pick up the image from the film when the latter is illuminated by light from the lamp 27 passing through the transparent rotary guide 45. The lens 71 projects the image against an angular mirror 98 secured to a rotatably adjustable plug 99 in the front of the yoke member 51. From the mirror 98 the image is reflected downward through an aperture 100 in the bottom of the sleeve 69 to a second angular mirror 101, thence via successive angular mirrors 102, 103, to a translucent reading screen 104 secured by means of an angle frame 105 in a hood 106 on the top of the casing 20, where it is brought to focus and adapted to be observed by the operator from the front of the projector.

The operation of the selector device is as follows: In reading and reference projectors, as in the device illustrated, it is desirable to project a single page or column or portion thereof at a time, thus securing the greatest available magnification thereof. By turning the knob 64 the operator causes the pinion 62 to move the rack 61 and yoke 51 transversely in the projector, the yoke shoes sliding in their guide rails as previously described. The sleeve 69, lens barrel 70 and lens 71 move laterally in the pocket 96, the lens 71 thus being brought in line with any desired column across the width of the film.

A plate 107 is secured to the front of the magazine 76 in line with a window 108 in the front of the projector casing 20. The plate 107 carries indicia such as numbers or letters 109, Fig. 5, referring to and disposed in line with the respective columns or pages in the film contained in the magazine, the said indicia being directly inside the window 108 when the magazine is in place. A vertical tongue 110, secured to the yoke 51 and movable therewith to traverse the indicia 109 may have an aperture 111, Fig. 2, in its upper end directly above its optical axis of the projection lens system and through which aperture the character corresponding to the column or page in registry with the lens may be observed, or the tongue may terminate in a pointer 110ª as shown in Figures 3 and 10.

Detents or protuberances 112 are provided on the plate 107 below the indicia 109. The tongue 110 is slightly resilient and has a perforation 113 adapted to snap into engagement with each of the detents 112 as the lens 71 comes into registry with the corresponding column or page indicated by the pointer 110ª or aperture 111. By this means, as a column is selected the optical system is accurately centered and latched in registry therewith, permitting the operator to make quick and easy selection of the desired column by observing the correspondingly indicated symbol on the magazine directly through the window 108, as shown in Fig. 10.

As the yoke 51 is moved laterally, the second rack 67 revolves the pinion 68 and shaft 35, causing the pinion 34 in the lamp housing 21 to actuate its rack 36 to move the plate 24 in the rails 22 and 23. The entire light source is thereby shifted in correspondence with the shifting of the lens 71 across the film 80. By this means a high concentration of light through the light-slot 31 may be used to illuminate only that portion of the film which is being projected, allowing the use of a comparatively small lamp 27 with concentrated filament and an efficient form of reflector 33. In practice an ordinary automobile lamp has been used, eliminating the necessity of using large and expensive projection lamps developing a large amount of heat. The close proximity of the shield 29 to the lamp 27 causes the former to absorb a large proportion of the heat which would otherwise be absorbed by the walls and top of the housing 21, the curved portion 30 overlying the lamp intercepting the heat rising directly therefrom. The shield readily delivers the heat to the air-stream, which enters the louvers 43, rises through the housing and passes out through the upper louvers 44. By the means described, the housing 21 is kept relatively cool, and the cylindrical guide 45 is effectively shielded from heat.

While, as stated above, the preferred form of the device includes a light source moving in synchronism with the lens, the selecting and indicating means is also operable with a stationary light source illuminating the entire width of the film. It is also evident that the device is equally applicable to projectors in which the film magazine is disposed horizontally, in which case the selecting and indicating structures are arranged for vertical instead of horizontal movement in order to move across the film in the manner described.

While the invention has been described in the preferred form, it is not limited to the precise structure shown, as various modifications may be made without departing from the scope of the appended claims.

What is claimed is:

1. In a projecting device including a main casing having an aperture therein and a film magazine enclosed in said casing, said magazine having a casing containing a pair of film reels and a film having thereon a plurality of images disposed across the width thereof, said film having a free portion extending between said reels and said magazine having alined apertures therethrough between said reels whereby light may pass through said free portion of the film, reference characters on the outside of said magazine casing corresponding to said images adapted to be viewed through said apertured main casing, detents on said magazine casing corresponding to said images, a lens support in said projector, a lens supported thereby adjacent the surface of said film and alined with apertures in said magazine casing, means to shift said support to move said lens transversely of said film, latching means on said support adapted to engage said detents whereby said lens may be selectively registered with said images, and means movable with said support to indicate said characters.

2. The invention claimed in claim 1 including a light source in line with said lens and adapted to illuminate said images, said source being moveable across said film in synchronism with said lens.

3. In a projecting device, a main casing, a film magazine enclosed in said casing, said magazine having a casing containing a pair of film reels and a film wound thereon and having a free portion extending between said reels and said magazine casing having alined apertures therethrough between said reels whereby light may pass through said free portion of the film, said film magazine being adapted for insertion and removable from said main mechanism as a unit, together with said reels and film, means partly on said main casing and partly on said film magazine for positioning the latter within said main casing, a projection lens on one side of said film, a light source on the other side of said film in line with said lens, and common means to move said lens and light source transversely of said film.

4. In a projecting device, a main casing and a film magazine having aligned apertures therethrough and having the apertured casing enclosed in said main casing and having two reels therein and a film wound on said reels, said film having a plurality of images disposed across the surface thereof, in combination, a light source adapted to project a beam of light through the apertures of said film magazine to illuminate one of said images on the film, a projection lens in the emergent beam from said apertures adapted to project said image, and means to adjust said light source and said lens across said film whereby said images may be selectively projected.

5. In a projecting device, a main casing and a film magazine having aligned apertures therethrough and having the apertured casing enclosed in said main casing and having two reels therein and a film wound on said reels, said film magazine being adapted for insertion and removable from said main mechanism as a unit, together with said reels and film, means partly on said main casing and partly on said film magazine for positioning the latter within said main casing, said film having a plurality of images disposed across the surface thereof, in combination, a light source adapted to project a beam of light into said apertured casing of said film magazine to illuminate one of said images on the film therein, a projection lens in the emergent beam from said apertured casing of said film magazine adapted to project said image, means to adjust said light source and said lens across said film whereby said images may be be selectively projected, and means to indicate the position of said lens and light source relative to said plurality of images, said means being operable independently of the illumination of said light source.

6. In combination, a film magazine comprised of a casing having aligned apertures therein, a pair of reels supported therein, and a film carried on said reels and spanning the axis of said apertures, containing said film having a plurality of images disposed across the width thereof, a projector having a casing from which said magazine may be removed as a unit and including a lamp positioned to eliminate said film, a lens adapted to project an image from said film, means for moving said lamp and lens to individually project said images, and means partly on said projector and partly on said magazine to select any one of said images for projection and hold said lamp and lens in co-operative position to project an image individually selected.

7. The combination claimed in claim 6 wherein said magazine has a casing the exterior of which carries reference characters corresponding to said images and wherein said projector comprises means to visually indicate the character corresponding to the image selected for projection.

8. In a projecting device, in combination, a casing, a film magazine in said casing and having aligned apertures therethrough, a yoke slidably mounted in said casing for movement transversely of said aligned apertures, a projection lens secured to said yoke, a lamp carrier in said casing and slidable therein parallel to the path of said yoke, a lamp on said carrier in optical alignment with said lens, manual means including an exterior handle to slidably position said yoke, and means connecting said yoke and said carrier whereby said carrier may be slidably positioned in synchronism with said yoke.

9. In a projecting device, in combination, a casing, a film magazine in said casing and having aligned apertures therethrough, a yoke slidably mounted in said casing, a projection lens secured to said yoke, a lamp carrier in said casing and slidable therein parallel to the path of said yoke, a lamp on said carrier in optical alignment with said lens, manual means including an exterior handle to slidably position said yoke for movement transversely of said aligned apertures, a heat-absorbing shield on said carrier adjacent said lamp and between said lamp and said lens, said shield having an aperture in line with said lens, and reflecting means on said carrier to concentrate and direct light from said lamp through said aperture.

10. A combination as claimed in claim 8 including resilient means to retain said yoke in position.

11. The combination as claimed in claim 8 wherein said connecting means comprises a rack on said yoke, a rack on said carrier, a shaft rotatably mounted in said casing, and pinions on said shaft in mesh with said racks.

12. A combination as claimed in claim 8 including means supported by said yoke and operable from the exterior of said casing to focus said lens.

13. In a projecting device having a main casing, a film magazine within said main casing and removable therefrom as a unit, said film magazine containing film reels and a film wound thereon, and said film magazine having a casing containing a lateral apertured pocket, and an apertured wall having its aperture alined with the aperture in said pocket, said film passing between said apertured pocket and wall, a projection lens supported in said projection device and mounted within said pocket, a condensing lens mounted in said projection device and having a portion adapted to fit within said apertured wall of said magazine casing, a light source supported within said main casing and adapted to project a beam of light through said condenser, film and projection lens, and means for laterally moving said light source and projection lens relative to said film.

14. The combination as claimed in claim 13 wherein the condensing lens is circular in form and is in contact with the surface of said film which conforms to a portion of the surface of said lens within the apertured casing of the film magazine.

15. The combination as claimed in claim 13 wherein the condensing lens is cylindrical in form and is mounted to frictionally engage the image bearing surface of said film to be revolved thereby when said film is wound from one to the other of said reels in said film magazine.

16. The combination as claimed in claim 13 wherein the emergent beam from said projection lens is reflected downwards below said film magazine, across below the bottom of same and upwards in the rear of said magazine and light source, thence across the top of said light source to a viewing screen located upon the top of said main casing, the plane of said screen being at an angle to the top surface of said main casing.

17. The combination as claimed in claim 13 wherein the emergent beam from the light source is defined by a shield mounted to be laterally movable with said light source.

18. The combination as claimed in claim 13 wherein said light source is provided with a housing enclosing the same said housing having an opening therein adapted to receive a portion of said condensing lens.

19. In a projector having a source of illumination, a condensing lens and an objective lens positioned on an optic axis therein, the combination with a film magazine comprised of, a casing having aligned apertures therethrough, a pair of reels therein, and a film carried on said reels, said magazine being definitely positioned in said projector with said apertures in line with said optic axis and adapted to be bodily removed from said projector.

VERNEUR E. PRATT.